(12) United States Patent
Mody et al.

(10) Patent No.: US 11,120,406 B2
(45) Date of Patent: Sep. 14, 2021

(54) PROCESS FOR ABUSE MITIGATION

(75) Inventors: Nirmal Mody, North Wales, PA (US);
Michael O'Reirdan, Palmyra, NJ (US);
Matt Scully, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 1512 days.

(21) Appl. No.: 11/560,437

(22) Filed: Nov. 16, 2006

(65) Prior Publication Data

US 2008/0120413 A1 May 22, 2008

(51) Int. Cl.
*H04L 12/58* (2006.01)
*H04L 29/06* (2006.01)
*G06Q 10/10* (2012.01)

(52) U.S. Cl.
CPC ........... *G06Q 10/107* (2013.01); *H04L 51/12* (2013.01); *H04L 63/1458* (2013.01); *H04L 51/28* (2013.01); *H04L 2463/141* (2013.01); *H04L 2463/144* (2013.01)

(58) Field of Classification Search
CPC .................. H04L 63/0227; H04L 63/1416
USPC ............................................. 709/226; 375/219
See application file for complete search history.

(56) References Cited

U.S. PATENT DOCUMENTS

| | | | | |
|---|---|---|---|---|
| 5,784,569 | A * | 7/1998 | Miller et al. | 709/235 |
| 6,643,260 | B1 * | 11/2003 | Kloth et al. | 370/235 |
| 6,687,740 | B1 * | 2/2004 | Gough | G06Q 10/107 |
| | | | | 709/201 |
| 7,155,738 | B2 * | 12/2006 | Zhu et al. | 726/4 |
| 7,274,667 | B2 * | 9/2007 | McKinnon et al. | 370/234 |
| 7,409,712 | B1 * | 8/2008 | Brooks et al. | 726/22 |
| 7,596,097 | B1 * | 9/2009 | McCowan et al. | 370/248 |
| 8,566,928 | B2 * | 10/2013 | Dagon | H04L 29/12066 |
| | | | | 726/22 |
| 8,843,652 | B2 * | 9/2014 | Balasubramanian | 709/232 |
| 2002/0078164 | A1 * | 6/2002 | Reinschmidt | 709/217 |
| 2002/0133613 | A1 * | 9/2002 | Teng et al. | 709/235 |
| 2003/0061338 | A1 | 3/2003 | Stelliga | |
| 2004/0030776 | A1 * | 2/2004 | Cantrell et al. | 709/224 |
| 2004/0146006 | A1 * | 7/2004 | Jackson | 370/230 |
| 2004/0205135 | A1 * | 10/2004 | Hallam-Baker | 709/206 |
| 2005/0002332 | A1 * | 1/2005 | Oh | 370/229 |
| 2005/0021740 | A1 * | 1/2005 | Bar et al. | 709/224 |
| 2005/0102427 | A1 * | 5/2005 | Yokota et al. | 709/245 |
| 2005/0105513 | A1 * | 5/2005 | Sullivan et al. | 370/352 |
| 2005/0120090 | A1 | 6/2005 | Kamiya | |
| 2005/0166049 | A1 * | 7/2005 | Touitou et al. | 713/170 |

(Continued)

FOREIGN PATENT DOCUMENTS

| WO | 0228127 A1 | 4/2002 | |
|---|---|---|---|
| WO | WO2006/102164 | * 9/2006 | G06F 15/16 |

OTHER PUBLICATIONS

"Technical Respones to Spam", Nov. 2003.*

(Continued)

*Primary Examiner* — Rupal Dharia
*Assistant Examiner* — Steven C Nguyen
(74) *Attorney, Agent, or Firm* — Banner & Witcoff, Ltd.

(57) ABSTRACT

Method of limiting offending messages communicated over a network, such as but not limited to messages associated with Spam and DoS attacks. The message limiting optionally including limiting bandwidth or other communication capabilities associated with an entity communicating or facilitating communication of the messages.

20 Claims, 2 Drawing Sheets

(56) References Cited

U.S. PATENT DOCUMENTS

| | | | |
|---|---|---|---|
| 2005/0177635 A1* | 8/2005 | Schmidt et al. | 709/226 |
| 2005/0283734 A1* | 12/2005 | Santoro et al. | 715/765 |
| 2006/0026678 A1* | 2/2006 | Zakas | 726/22 |
| 2006/0031306 A1 | 2/2006 | Haverkos | |
| 2007/0066297 A1* | 3/2007 | Heidari-Bateni | 455/423 |
| 2008/0049619 A1* | 2/2008 | Twiss | H04L 45/04 370/236 |
| 2008/0140847 A1* | 6/2008 | Almog | 709/228 |

OTHER PUBLICATIONS

International Search Report for corresponding International Application No. PCT/US/07/84756, dated Jun. 6, 2008, 7 pages.
Supplementary European Search Report for application No. 07871476 dated Jan. 25, 2011.
European Office Action—EP 7871476.3—dated Jun. 23, 2015.
Response to European Office Action—EP Appl. 07871476.3—submitted Dec. 21, 2015.

* cited by examiner

PROCESS FOR ABUSE MITIGATION

BACKGROUND OF THE INVENTION

1. Field of the Invention

The present invention relates to methods and systems associated with reducing malicious communications over an Internet Protocol (IP) network, such as but not limited to reducing messaging associated with Spam and Denial of Service (DoS) attacks.

2. Background Art

Spam, Denial of Service (Dos) attacks, and any number of other attacks may disrupt network based services. Spam can be described as transmission of unsolicited email messages to a large number of users and devices on public or private data networks. Spam constitutes up to 90% of email traffic on the Internet. Spam is a vehicle for phishing attacks on internet users and it is leading to distrust of the Internet and reduced usage of some services as a result. Spam can be sent knowingly by a user (Spammer) or unknowingly when the user's device is compromised with mal-ware (BOTS) that gives another user control of that user's device. Typically, the user is completely unaware that their device has been compromised. The purpose of BOTS is to compromise the user's privacy, financial data (phishing) and to seek other vulnerable targets on data networks and infect them as well.

While one BOT would have minimal effect on the ISP's network, BOTS belonging to BOTnets can generate large amounts of traffic in the form of Spam and DoS attacks. In the normal course of mal-ware operations command and control centers provide instructions to BOTS. Typically assigned instructions include a list of nodes or IP address which the BOT is to target with DNS queries, replication attempts and open mail servers. The BOT generates large numbers amounts of DNS queries to resolve domain names pre-fix such as Mail or SMTP to a valid IP address and vise a versa, for example the BOT will attempt to when resolve "mail.comcast.net" to a valid IP address, i.e. 63.240.76.7210. Once the BOT finds an open Mail System, it will attempt send out either vast quantities of unsolicited mail containing advertisements and or phishing scams. BOTS are also self-contained, in that they have the ability to act as mail-relay agents if they can not find any one mail servers. The purpose of phishing is to obtain financial information such as credit card numbers and account information from the mail's recipient. Typically by tricking the user to believe that the email is legitimate.

Another common problem includes ICMP "Ping" and Port scans of IP addresses in order to infect other devices on the Internet. These are devices are typically insecure computers with either outdated or no anti-viral software and or lacking operating system security updates.

To counteract the effects of BOTS, Internet Service Providers (ISPs) have to increase spending on anti-abuse systems and provide tools for its subscriber base. The ISP absorbs this cost in most cases but not all users download the free software which keeps their computers vulnerable. The other risk that ISPs faces is to increase spending on high-availability of its systems, especially mail and DNS systems. This is because email severs process millions of messages and has to determine the legitimacy of each email.

As stated previously 90% of messages are spam so when the operator's mail system receives an outbound mail it would have to scan each message to determine if it is Spam or contains a virus or is a valid email. Continuous transmission by thousands of BOTS and the sheer volume eventually results in a significant slow down of the system to a state which interferes with the normal email delivery of benevolent/worthy users or possibly a system crash. Email systems are not 100% accurate in identifying and filtering Spam email such that Spam email gets delivered to a vast array of users who in turn complain to their ISP. This leads to another problem faced by the ISP in having mail and IP addresses from their domain name, i.e. "comcast.net," black-listed because users within that domain are identified as hosting BOT-nets. Unfortunately, because of BOTS, mail from creditable users is also blocked by the receiving ISP.

Deep packet inspection (DPI) technology is accurate for identifying friend or foe SMTP traffic as it relies on heuristics and various rule sets to categorize SMTP traffic for legitimacy. Additionally, statistical analysis of DNS query pattern analysis can also be used to identify BOTS on the network. These systems and processes coupled with PacketCable Multimedia form an effective detection and enforcement process to stop Spam and other forms of malicious traffic.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
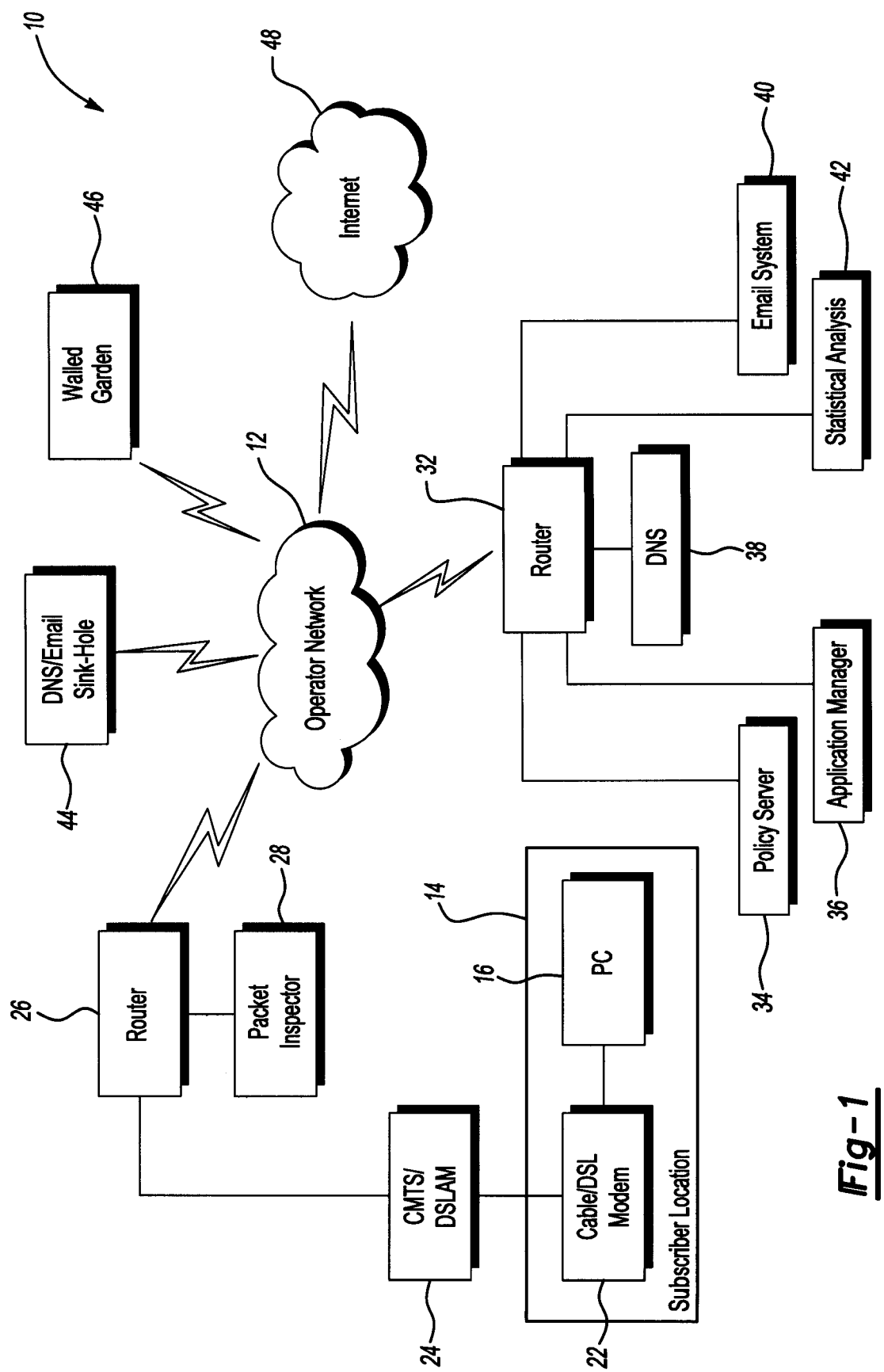
FIG. 1 illustrates a system for providing media content in accordance with one non-limiting aspect of the present invention.

FIG. 1 illustrates a system 10 for providing media content in accordance with one non-limiting aspect of the present invention. The system 10 may include a media provider (not shown) for providing media services over an operator network 12 to subscribers at one or more subscriber locations 14. The system 10 may 10 include elements suitable for the mitigation of malicious messages carried over the network 12, such as but not limited to elements associated with mitigating malicious messages use with Spam and Denial of Service (DoS) attacks.

The media provider, for exemplary purpose, is most prominently described with respect to being a cable television service provider having capabilities for providing cable television, telecommunications, and high-speed data services to the subscriber locations, primarily through wired and/or wireless communications. The present invention, however, is not so limited and fully contemplates the provider being associated with any type of service provider, including other television providers (IP, broadcast, satellite, etc.) and non-television providers, such as those associated with high-speed data, telecommunications, cellular communications, and the like.

The media provider may be configured to support and/or facilitate the use of any number of television and non-television services and applications, such as, but not limited to email services, data transmission service, linear and non-linear television programming/signaling (cable, satellite, broadcast, etc.), Video on Demand (VOD), interactive television (iTV), interactive gaming, pay-per-view (PPV), digital video recording (local and remote), and/or broadcasting of signals associated with supporting television programming, movies, audio, and other multimedia, as well as, downloading of clips or full-length versions of the same. The messages associated with these and any number of other services may be limited in accordance with the present invention.

The network 12 may include any number of features and devices to facilitate signal transportation and other operations associated with interfacing the subscriber locations with each other and otherwise supporting communications associated with services of the media provider. The network 12 may include terrestrial and extraterrestrial components and infrastructures, including cable lines, telephone lines, and/or satellite or other wireless architectures. The network 12 may be associated with other private and/or public networks, such as the Internet and dedicated or virtual private networks.

Each subscriber location 14 may include one or more media devices, such as but not limited to a personal computer 16, to facilitate user interaction with the media content/services. The scope of such interaction may be based on subscriptions and other parameters set by the media provider. The subscriptions may specify various classes of services and other parameters associated with usage rights and services available to the corresponding subscriber.

The media devices may relate to any number of devices suitable for interfacing and/or facilitating interfacing the subscribers. For example, the media devices may be a settop box (STB), digital video recorder (DVR), personal computer (PC), television (which may include embedded user interface and processing capabilities), outlet digital adapter (ODA), media terminal adapter (MTA), cable modem (CM), personal digital assistant (PDA), computer, mobile device (phone, computer, etc.), personal media device, and any other item having capabilities to supporting access to any number of the services. The messages associated with supporting or interacting with these and any number of other media devices may be limited in accordance with the present invention.

The media devices may be configured to descramble and to support and/or facilitate the use of any number of television and non-television related signals, such as, but not limited to, Hyper Text Transfer Protocol (HTTP), Dynamic Host Configuration Protocol (DHCP), Syslog, Simple Network Management Protocol (SNMP), Trivial File Transfer Protocol (TFTP), Data Over Cable Service Interface Specification (DOCSIS), Domain Name System (DNS) applications, DOCSIS Settop Gateway (DSG), out-of-band (OOB) messaging, and others.

The content sources be associated with the media provider (which in turn may receive the content from other sources) and/or one or more of the subscriber devices or other non-subscriber devices connected to the network. For example, if the media provider is a television service provider, a portion of the media content may relate to television programs, movies, and other multimedia packets. This content may be delivered from the media service provider to the subscribers through streaming, downloading, broadcast, peer-to-peer, and any number of other processes.

The media content may be delivered to the subscriber locations directly from the media service provider and/or from one or more of the other devices in communication therewith. In more detail, as is common with larger media content providers, multiple regional enterprises, such as headend units and the like, may be configured to provide regional programming to a number of subscribers associated therewith. Each of the headends may store various types of media content for distribution to the subscribers it services. Optionally, the headends may be configured to support headend to headend communications such that non-direct subscribers, i.e., those supported by other headends, may similarly receive content from other headends.

In addition, some of the media content may be sourced from the subscribers themselves, such as by transporting content stored locally on the home networks of the subscribers to other locations within the same home network and/or to other locations beyond the home network that are in communication therewith by way of the network. The media provider may include features and capabilities to facilitate such inter-subscriber communications.

The system 10 may include any number of elements associated with mitigating malicious messaging in accordance with the present invention. For exemplary purposes only, and without intending to limit the scope and contemplation of the present invention, the present invention is predominately described with respect to limiting BOTS, Zombies, or other attackers from utilizing the subscribers PC 16 to send Spam and/or execute DoS attacks. The present invention, however, fully contemplates the mitigation of malicious messaging associated with and originating from any number of locations and element, both inside and outside of the system, and not just PCs associated with subscriber locations.

The system 10 may include a cable modem (CM) 22 or digital subscriber line (DSL) modem, a cable modem termination system (CMTS) 24 or digital subscriber line access multiplexer (DSLAM), a first router 26, a deep packet inspector 28, a second router 32, a policy server 34, an application manager 36, a domain name system (DNS) 38, a voicemail/email system 40, a statistical analysis server 42, a DNS/email sink-hole 44, a walled garden 46, and an open network (not controlled by media provider) 48. These elements may operate in conjunction with each other and other elements to facilitate limiting messaging associated with the same or other elements.

The Deep Packet Inspection system 28 may be responsible for identifying malicious traffic originating from the subscriber device 16. The Packet Inspection system 28 may also be responsible for signaling to the Application Manager (AM) 36 to mitigate the abuse. The AM 36 may receive a request for a Quality of Service policy to be enforced for an IP address on the ISP's network which has been identified as generating malicious messaging. The AM 36 serves as a Policy Decision Point (PDP) to determine if the intended action is authorized for the particular user.

The Policy Server (PS) 34 may be a component which acts as a policy decision point for the CMTS 24 and a policy enforcement point to the AM 36. The PS 34 may be responsible for managing CMTS resources and establishing the service flow on the CMTS 24 when requested by the AM 36. The CMTS 24 may maintain a state for each CM 22 in the form of provisioning and admission control. It may also act as a routing device which converts Radio Frequency (RF) signals from the CM 22 into binary (packetized) format for transport on the network.

The routers 26, 32 may then be used to further interface signal between the CMTS 24 and other elements in the system 10 for further transport over the network 12. The packet inspector 28 may utilize a set of heuristics for identifying application level attacks based on the contents of the packet. The DNS and email sink-hole 44 may be a spoofed DNS or email server that responds with a non-valid IP address when queried with a type A DNS query request or a SMTP mail-server which responds with successful acknowledgements to outbound emails such that it may be used to keep Spam email and DNS query messages from leaving the operator's network. The walled garden 46 may be a captive web-portal, typically on the operator's network, where all HTTP queries are redirected to for purposes of self-care, self-registration and notifications.

For example, if the PC 16 initiates the transmission of vast quantities of mail messages via the SMTP protocol on port 25 or a DNS DoS attack on port 53, the DPI 28 may analyze the frequency, count, or other indicator of traffic against a desired traffic threshold and provide an indication of the same to the AM 36. For example, if the message type (email (port 25), DNS query (port 53), etc.) from the same user/device (IP address or host-name) exceeds a pre-set threshold (500 message per minute), a signal may be sent to the AM 36 regarding the triggering event. The contents of the signal may include the IP address, source port and destination port of the originating device, i.e., the spammer.

The AM 36 may then parse the message, verify that the IP address of the source falls within its managed domain, and trigger an action against the user based on a policy defined by the media provider or other operator associated with the system. For example, the AM 36 may trigger the policy server 34 to set a bandwidth restriction policy on the subscriber's bridging device, such as the CM 22. The policy restriction may be limited to the port or other interface associated with the message. This allows the subscriber to execute normal operations of the other ports, such as allowing an unsuspecting subscriber to maintain at least PC functionality. The policy may include throttling the bandwidth of the port, for example to 500 bits per second, on any traffic associated with the port, i.e., port 25 for email, port 53 for DNS queries, and port 80 for web activities.

The SMTP packets or other packets associated with email, for example, may be tagged with a Type of Service marking so that any packet from the PC 16 bound on port 25 may be diverted to the sink-hole email system 44 by the router 26 residing on the operator's domain. This allows the sink-hole email system 44 to respond with a successful acknowledgment message to purposely mislead the Spammer/BOT, which can be helpful in making certain that the Spammer/BOT does not switch ports and re-initiate its efforts. The packets or other information associated with DNS queries may be similarly diverted to the DNS sink-hole 44 for the same purposes. The DNS sink-hole 44 may respond with a invalid IP for any type A DNS query such that DoS or ICMP packets attached to valid websites are prevented from exiting the PC.

Other traffic, i.e. that are not particularly associated with the attached ports (HTTP/HTTPS), may be associated may be diverted to a sink-hole garden 44 in order to prevent the further spread of the virus to other elements in contact with the network. Any HTTP/HTTPS traffic is redirected to the walled-garden 46 where users may be notified about the specifics of the abuse and be provided with anti-virus/anti-malware tools to clean their PC. Optionally, the operator may also set up a rule to drop all packets from that modem 22 outside the routing domain of the operator. Such a policy would force the subscriber to either clean their devices manually or stop the abuse of the network.

BOTS and Spammers could potentially adapt overtime to undermine the use of Deep Packet Inspection systems the chances are that small percent of Spam and DoS packets will go undetected by the DPI technology. As such, application usage via statistical analysis such as DNS query pattern analysis becomes important. In addition to or in place of the packet inspector, the statistical analysis 42 system may be used to identify BOTS on the network. The statistical analysis system 42 may continuously monitor application server usage such as that of DNS, Email or Voice Mail Systems. It may perform a query, for example, of the top 20 clients queering the DNS servers or voice-mail system on a random interval. The AM 36, such as the DNS server 38, may provide the IP address and query rate of users. Similar to the packet inspector heuristics, the statistical analysis system 42 may determine if the query rate, type and statistics, warrants a notification via a mediation layer to both the AM 36 and the packet inspector 28 to implement the protection procedures described above. The message may contain a unique event-id, IP address of the suspected abuser, abuse type, in this example DNS, and the port number for DNS, (TCP 53).

As described above, various elements in the system may collaborate to mitigate malicious message attacks. The various elements are shown to be separate features within the system, however, the present invention is not intended to be so limited. The present invention fully contemplates any one or more of the operations described above with respect to the separate elements to be combined or otherwise executed by a common or standalone entity, such as for example with a traffic agent having capabilities to execute any number of the operations described above.

Figure 2:
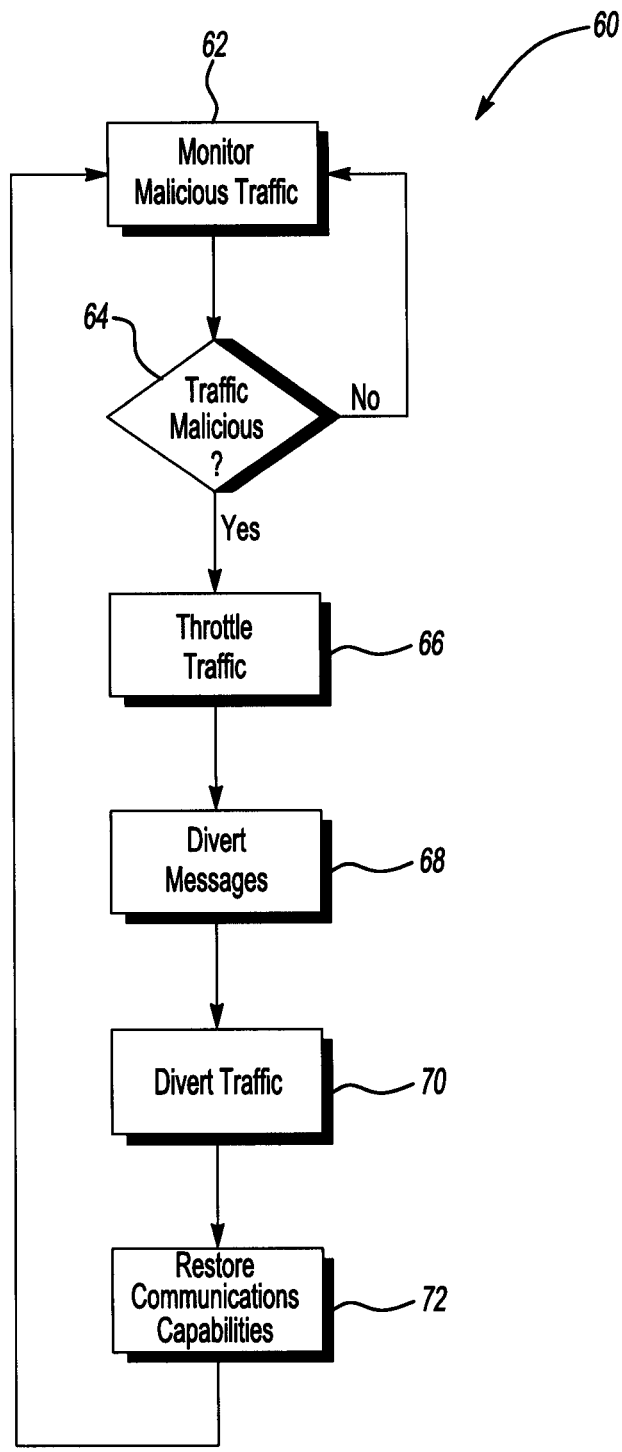
FIG. 2 illustrates a flowchart of a method of mitigating malicious messages in accordance with one non-limiting aspect of the present invention.

FIG. 2 illustrates a flowchart 60 of a method of mitigating malicious messages communicated over a network from a computer to one or more remotely located network elements associated with a network in accordance with one non-limiting aspect of the present invention. The method may be implemented with one or more of the elements associated with the system and/or through some other entity or element having capabilities sufficient to support the operations described herein.

Block 62 relates to monitoring malicious messaging traffic levels for one or more elements associated with a network, such as but not limited to a PC of a subscriber associated with a provider of the network. The monitoring may include inspecting traffic, bandwidth consumption, and/or any number of operations associated with transmitting messages over the network. The monitored messages may be associated with any type of network element and traffic associated therewith. The message may comprise a complete set of data and/or individual bits, bytes, or packets of data.

Block 64 relates to determining whether the messaging traffic is above a threshold associated with normal messaging activities, i.e., determining whether the traffic is indicative of malicious messaging. The threshold may be set according to any number of operating parameters and requirements of the service provider and/or subscriber. Optionally, different thresholds may be established for different messaging types, i.e. email, DNS, web, etc., such the present invention may be able to monitor one or more types of messaging associate with the PC.

Block 62 is returned to if the messaging traffic is commiserating with normal messaging activities, i.e., no corrective action is deemed necessary. Block 66, however, is reached if the messaging traffic indicates an attack or other abnormal activity that may be associated with malicious conduct by a PC and/or the like. Block 66 generally relates to limiting the communication capabilities of the offending entity so as to limit the proliferation of the malicious messages. This may include mitigating the malicious traffic to levels below the normal threshold, which may be referred to as a restricted threshold.

The communication capabilities may be limited according to any number of parameters associated with the offending messages. For example, bandwidth allocated to a port associated with the offending message type may be throttled or otherwise limited. The bandwidth may be restricted so as to permit some of the offending messages to be transmitted from the computer without alerting the BOT or zombie of the restriction. This may include limiting bandwidth allocated to particular ports as a function of the message type, such as but not limited to throttling port 25 for offending email message, port 53 for offending DNS queries, and port 80 for offending web queries.

Block 68 relates to diverting the offending messages that are permitted to be transported over the throttled bandwidth. These messages may be diverted to a sink-hole or other entity suitable for preventing the messages from reaching locations beyond the provider network. The entity may also include capabilities to acknowledge delivery of the offending messages such that the BOT/Spammers is mislead into believing the message reached the intended recipient. Optionally, non-offending messages may be similarly diverted and/or held until the BOT/virus is cleaned from the PC or others removed so as to prevent the spread of the BOT/virus from the offending PC.

Block 70 relates to diverting HTTP queries or other traffic of the offending PC to a walled garden or other entity in the control or directed by media provider. The entity may be a webpage or other portal having capabilities for notifying the subscriber of the communication restrictions. The entity may further include utilities or other tools for download that may be used by the subscriber to eliminate the BOT/virus from their computer.

Block 72 relates to restoring the restricted communication capabilities after removal or cleansing of the BOT(s) associated with implementing the same. This may include increasing the bandwidth allocated to the offending messaging type from the restricted threshold to the normal threshold or non-restricted threshold such that the associated port may be free to communicate at any level. Block may be returned to monitor future messaging of the PC.

As demonstrated above, one non-limiting aspect of the present invention relates to significantly reducing Spam and Denial of Service attacks generated by a customer on an ISP's network. The invention may include a process to utilize packet inspection technology along with various network services, such as DNS, coupled with PCMM Application Manager and Policy Servers to dynamically identify, signal, throttle, and notify abusive subscribers. The process may include a solution to re-direct or otherwise divert malicious traffic to a "sink-hole" system and re-direct HTTP queries to a walled-garden where the Spammers can be notified of their actions and provided tools for self-care if the user is unaware of their computer being infected.

Optionally, the present invention provides an end-to-end solution for detecting and mitigating various types of abuse scenarios. Additionally, the process introduces other concepts such as defining the use of Type of Service (ToS) an DiffServ Code Point (DSCP) marking of malicious IP packets so they may be redirected to a walled-garden or sink-hole systems. The proposal also defines the option where the Operator's DNS, E-Mail or Voice Mail system can detect and signal the PCMM Application Manager if the packet inspection technology fails to identify abuse. The process also includes an Email and DNS sink-hole to generate false notification to Spammer to keep them from going dormant or utilizing alternate ports.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
    monitoring, by a computing device of a first network, traffic levels of at least one message type received, via the first network, by the computing device from a device communicating via the first network;
    receiving, from the device via the first network, an outgoing message that is of the at least one message type and that is intended for transmission to an intended destination device of a second network different from the first network; and
    responsive to a determination that transmission of the outgoing message would exceed a limitation on transport of messages that are of the at least one message type and that are received from the device via the first network, transmitting, to the device via the first network, a response to the outgoing message that comprises an invalid Internet Protocol (IP) address configured to prevent at least one subsequent message of the at least one message type from being transmitted from the device via the first network.

2. The method of claim 1, further comprising:
    setting the limitation on transport; and
    while the limitation on transport is set, permitting at least one message of a second type received from the device to be transmitted, via the first network, to one or more network devices.

3. The method of claim 1, further comprising:
    tagging, in response to determining that the outgoing message is of the at least one message type, the outgoing message; and
    diverting, to a sink-hole device of the first network, the outgoing message;
    wherein the transmitting the response to the outgoing message is performed by the sink-hole device.

4. The method of claim 1 further comprising transmitting, to the device, a message, wherein the message comprises an indication of the limitation on transport.

5. The method of claim 1, wherein the outgoing message comprises a domain name system (DNS) request, and wherein the method further comprises:
    diverting, to an address associated with a sink-hole device of the first network, the DNS request, and
    wherein the invalid IP address is configured to prevent the at least one subsequent message from exiting the device.

6. The method of claim 1, wherein the limitation on transport limits the messages that are of the at least one message type and that are received from the device to a reduced traffic level that is below a normal traffic level.

7. The method of claim 6, wherein the reduced traffic level is below a restricted traffic level that is below the normal traffic level.

8. The method of claim 1, further comprising:
   diverting, to an address associated with a sink-hole device of the first network, an email; and
   transmitting, by the sink-hole device, an acknowledgement that provides a false indication of successful receipt of the outgoing message by an intended Simple Mail Transfer Protocol (SMTP) server.

9. The method of claim 1, wherein the messages that are of the at least one message type and that are received from the device via the first network are received from the device on a particular port.

10. The method of claim 1, wherein the device is associated with a user location, and wherein the invalid IP address is configured to prevent the at least one subsequent message from exiting the user location.

11. A method comprising:
   monitoring, by a computing device of a network, traffic levels of domain name system (DNS) requests that are received from a device via the network; and
   responsive to a determination that transmission of a received DNS request would exceed a bandwidth limitation, preventing the received DNS request from being transmitted to a DNS server and transmitting, to the device via the network, a response to the received DNS request that comprises an invalid Internet Protocol (IP) address configured to prevent at least one subsequent message from being transmitted from the device via the network.

12. The method of claim 11, wherein the response provides a false indication of successful receipt of the received DNS request by the DNS server.

13. The method of claim 11, wherein the invalid IP address is configured to prevent the at least one subsequent message from exiting the device.

14. The method of claim 11, wherein the bandwidth limitation is applied to limit transport of the DNS requests that are received from the device on a particular port.

15. The method of claim 11, wherein the network is operated by a service provider and wherein the device is part of a user location network, and wherein the method further comprises:
   setting the bandwidth limitation; and
   while the bandwidth limitation is set, permitting at least one email message received from the device to be transmitted, via the network, to an email server.

16. The method of claim 11, wherein the transmitting the response to the received DNS request is performed by a sink-hole device of the network.

17. A method comprising:
   monitoring, by a computing device of a network, traffic levels of at least one message type that are received from a device via the network; and
   responsive to a determination that transmission of a received message of the at least one message type would exceed a limitation on transport of messages of the at least one message type, preventing the received message from being transmitted to a destination indicated by the received message and transmitting, to the device via the network, a response to the received message that comprises an invalid Internet Protocol (IP) address configured to prevent at least one subsequent message from being transmitted from the device via the network.

18. The method of claim 17, wherein the limitation on transport of the messages is applied to limit transport of the messages that are received from the device on a particular port.

19. The method of claim 17, wherein the network is operated by a service provider, wherein the device is part of a user location network, and wherein the method further comprises:
   setting the limitation on transport of the messages; and
   while the limitation on transport of the messages is set, permitting at least one email message received from the device to be transmitted, via the network, to an email server.

20. The method of claim 17, wherein the preventing the received message from being transmitted to the destination indicated by the received message comprises diverting the received message to a sink-hole device of the network, and wherein the sink-hole device is assigned an IP address for the network, and wherein the transmitting the response to the message is performed by the sink-hole device.

* * * * *

UNITED STATES PATENT AND TRADEMARK OFFICE
CERTIFICATE OF CORRECTION

PATENT NO. : 11,120,406 B2  
APPLICATION NO. : 11/560437  
DATED : September 14, 2021  
INVENTOR(S) : Mody et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1524 days.

Signed and Sealed this  
Sixth Day of December, 2022

Katherine Kelly Vidal  
*Director of the United States Patent and Trademark Office*